(12) United States Patent
Courtney et al.

(10) Patent No.: US 11,381,401 B2
(45) Date of Patent: Jul. 5, 2022

(54) BLOCKCHAIN TRANSACTION FORWARDING

(71) Applicant: Seagate Technology LLC, Cupertino, CA (US)

(72) Inventors: Timothy J. Courtney, Longmont, CO (US); Meherzad F. Aga, Longmont, CO (US); Syed Y. Abbas, Longmont, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 264 days.

(21) Appl. No.: 16/736,648

(22) Filed: Jan. 7, 2020

(65) Prior Publication Data

US 2021/0211298 A1 Jul. 8, 2021

(51) Int. Cl.
*H04L 29/06* (2006.01)
*H04L 9/32* (2006.01)

(52) U.S. Cl.
CPC ........ *H04L 9/3247* (2013.01); *H04L 2209/38* (2013.01)

(58) Field of Classification Search
CPC .................... H04L 9/3247; H04L 2209/38
See application file for complete search history.

(56) References Cited

U.S. PATENT DOCUMENTS

| | | | |
|---|---|---|---|
| 10,666,767 B1* | 5/2020 | Floyd | H04W 12/10 |
| 2004/0068465 A1* | 4/2004 | Nagamine | G06Q 20/385 |
| | | | 705/38 |
| 2019/0160660 A1 | 5/2019 | Husain et al. | |
| 2019/0180276 A1* | 6/2019 | Lee | H04L 63/10 |
| 2019/0279210 A1 | 9/2019 | Pen | |
| 2020/0059369 A1* | 2/2020 | Li | H04L 9/3239 |
| 2020/0112555 A1* | 4/2020 | Brown | H04L 63/0884 |
| 2020/0120039 A1* | 4/2020 | Tabares | H04L 47/783 |
| 2020/0145234 A1* | 5/2020 | Nishijima | H04L 9/3268 |
| 2020/0175003 A1* | 6/2020 | Jiang | G06Q 40/04 |
| 2020/0320529 A1* | 10/2020 | Lyadvinsky | G06Q 20/223 |
| 2021/0158312 A1* | 5/2021 | Arora | G06Q 20/40 |
| 2021/0256007 A1* | 8/2021 | Wu | G06F 16/2379 |
| 2021/0342946 A1* | 11/2021 | Leise | H04L 9/0637 |

* cited by examiner

Primary Examiner — Ghodrat Jamshidi
(74) Attorney, Agent, or Firm — Holzer Patel Drennan

(57) ABSTRACT

The technology disclosed herein provides a blockchain transactions forwarding mechanism that allows for tracking and notification from the originating blockchain through to a last blockchain and back again. An implementation of the system disclosed herein also provides a whitelist mechanism to provide a list of acceptable blockchains or nodes that may receive transactions. Yet another implementation provides a predetermined hop count that may be used as the maximum allowable hop counts that provides the number of times a transaction is allowed to be forwarded.

20 Claims, 8 Drawing Sheets

BLOCKCHAIN TRANSACTION FORWARDING

BACKGROUND

Blockchains are quickly becoming accepted tools for organizing supply chains in various industries. Specifically, blockchains have been successfully deployed in recording and verifying transactions at various stages of supply chains, such as at production, shipping, sales channels, etc. State of the art blockchain systems may include a large number of blockchains communicating information about one or more transactions between such disparate blockchains. For example, an implementation of supply chain may include one blockchain that manages transactions at the shipping stage while another blockchain to manage transactions through sales channels. When a large number of blockchains are used, tracking merchandise and transactions between such blockchains generates its own unique challenges.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein provides a blockchain transactions forwarding mechanism that allows for tracking and notification from the originating blockchain through to a last blockchain and back again. An implementation of the system disclosed herein also provides a whitelist mechanism to provide a list of acceptable blockchains or nodes that may receive transactions. Yet another implementation provides a predetermined hop count that may be used as the maximum allowable hop counts that provides the number of times a transaction is allowed to be forwarded.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

The technology disclosed herein provides a blockchain transactions forwarding mechanism that allows for tracking and notification from the originating blockchain through to a last blockchain and back again. An implementation of the system disclosed herein also provides a whitelist mechanism to provide a list of acceptable blockchains or nodes that may receive transactions. Yet another implementation provides a predetermined hop count that may be used as the maximum allowable hop counts that provides the number of times a transaction is allowed to be forwarded.

In one implementation, a distributed ledger node may be generated based on a hash generated using information about a transaction object, hop count associated with the transaction object, whitelist information associated with the transaction object, etc., together with a digital signature of a device where such hash is generated. Such distributed ledger node may be stored on a distributed ledger. In one implementation, a copy of the distributed ledger may be stored in the memory of the device creating the security node. Alternatively, the distributed ledger may be stored on a network such as the Internet, which may be accessible to other third parties for independent verification.

An example of the distributed ledger is blockchain. Specifically, a blockchain is a decentralized and distributed digital ledger that is used to record transactions across many computers so that the record cannot be altered retroactively without the alteration of all subsequent blocks and the collusion of the network. This allows the participants to verify and audit transactions inexpensively. Thus, the distributed ledger provides a rich documentation and authentication about hop count and whitelist information associated with a transaction object. One or more forwarding agent of the distributed ledger may use the hop count and whitelist information associated with the transaction object to determine an action to be taken with the transaction object.

Figure 1:
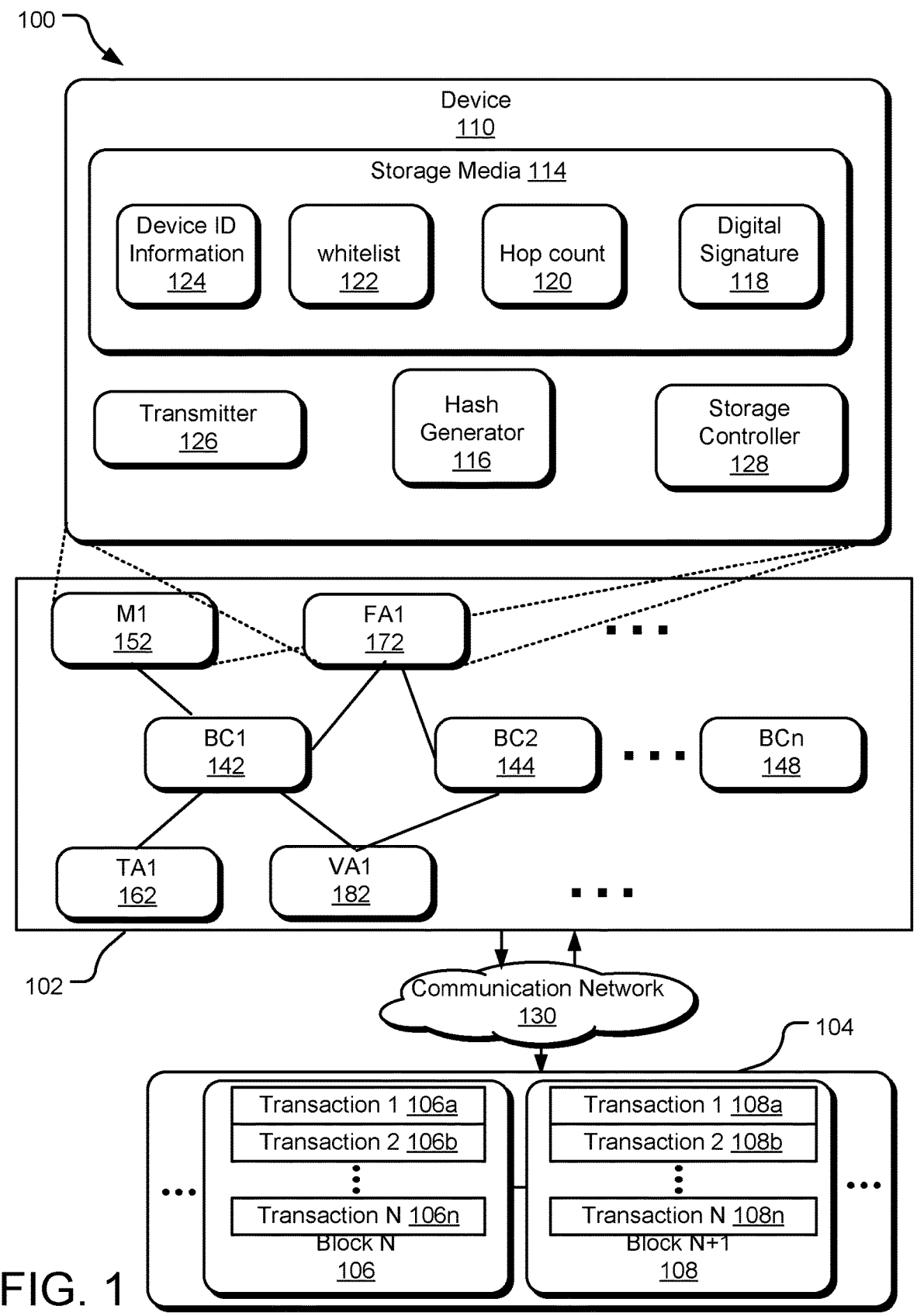
FIG. 1 illustrates an example block diagram of a distributed ledger node used for the blockchain transaction forwarding system disclosed herein.

FIG. 1 illustrates an example block diagram 100 of a blockchain transaction forwarding system 102 using an example distributed ledger 104 to allow a set of network attached devices to communicate validated transactions between various distinct blockchains. The BTFS 102 may be include a number of blockchains BC1 142, BC2, 144, . . . BCn 148 where these blockchains are also communicatively connected to a number of other interconnected devices identified as nodes. In the illustrated implementation of the BTFS 102 one or more of the blockchains are connected to a miner node M, a forwarding agent node FA, a transacting agent node TA, and a validating agent node VA. For example, the blockchain BC1 142 is connected to a miner node M1 152, a transacting agent node TA1 162, a forwarding agent node FA1 172, and a validating agent node VA1 182. Furthermore, each of the blockchains 142, 144, 148 may include a plurality of transaction blocks, such as a block N 106 storing transactions 106a . . . 106n, a block N+1 108 storing transactions 108a, . . . 108n, etc.

Configuration of each of the agent nodes 142-182 may be illustrated by a device 110. The device 110 may also include a storage media 114 and a storage controller 128. Specifically, the storage media 114 store a digital signature module 118 that generates a digital signature that may be used together with device ID 124 by a hash generator 116 to generate a hash that may be transmitted by a transmitter 126 to other of the nodes 142-182. Furthermore, the storage media 114 may also include a hop count database 120 and a whitelist database 122. The hop count database 120 may include hop count to be associated with each transaction for a given blockchain.

For example, a transaction generated in the blockchain BC1 142 may have associated hop count of 2 specifying that the transaction may be forwarded to only two subsequent blockchains. The whitelist database 122 may provide information about approved blockchains to which a transaction generated in a particular blockchain may be forwarded. Thus, a whitelist entry associated with the blockchain BC2 144 may provide that a transaction from the blockchain BC2 144 may be forwarded only to blockchain BC1 142 and a blockchain BCn 148. The hash generator 116 may generate a hash using the digital signature from the digital signature module 118, a hop count from the hop count database 120, a whitelist information from the whitelist database 122, and a device ID information 124. Furthermore, the hash generator 116 may also use information about previous transactions from the distributed ledger 102 when generating a new hash.

Figure 2:
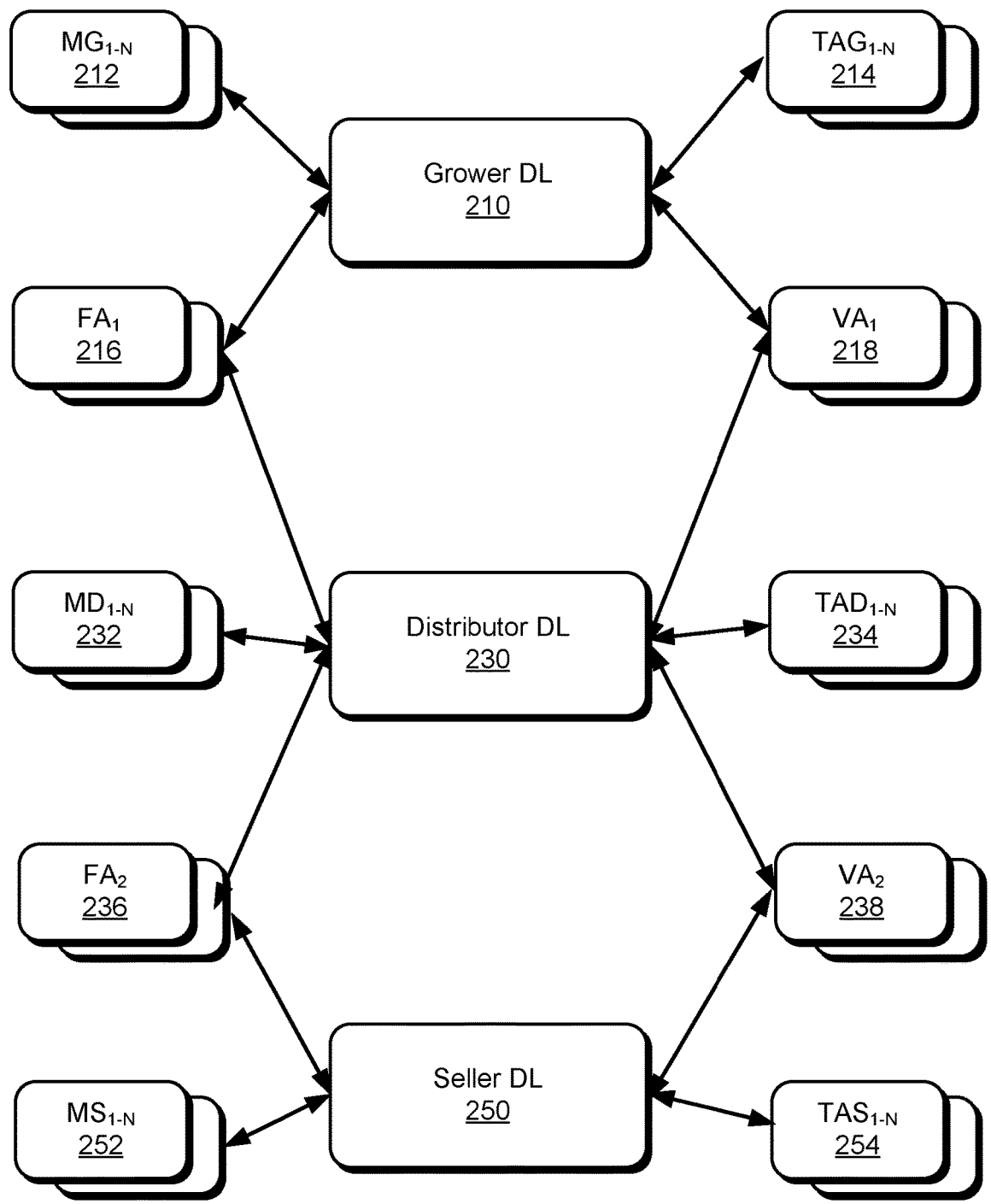
FIG. 2 illustrates an example block diagram of the blockchain transaction forwarding system disclosed herein.

FIG. 2 illustrates an example block diagram of the validated blockchain transaction forwarding system 200 disclosed herein. As an example, the BTFS 200 is implemented between three blockchains or distributed ledgers (DL), namely a grower DL 210, a distributor DL 230, and a seller DL 250. Specifically, the grower DL 210 may be a blockchain used to manage transactions generated and validated by grower of a particular commodity, such as fruits. Thus, each transaction stored on the grower DL 210 may be a transaction validated by various nodes of the grower DL 210. Transactions stored on the grower DL 210 may be transactions identifying the produce, the location information about the produce, the harvesting information about the produce, the safety test results and/or certifications about the produce, etc.

On the other hand, the distributor DL 230 may validate and store various transactions related to the distribution of the produce including packaging information, pick up and delivery information, refrigeration certification, etc. The seller DL 250 may validate and store various transactions about sale of the produce, including information about date and time of sale, sale price, customer information, etc.

While each of these blockchains 210, 230, 250 may be self-contained in that they may not need to exchange information with outside parties, often it is necessary for transactions stored in one blockchain to be forwarded to another blockchain. For example, a grower DL transaction in the grower DL 210 may be a preceding transaction for a distribution transaction in the distributor network 230. Furthermore, such grower DL transaction in the grower DL 21 may also be used together with a sale transaction in the seller DL 250. The BTFS 200 provides a mechanism that allows for tracking and notification from an originating blockchain such as the grower DL 210 through to the last blockchain, such as the seller DL 250 using a transaction from the grower DL 210 and back. Furthermore, the BTFS 200 also provides a whitelist mechanism to control which blockchains a transaction from the grower DL 210 may be forwarded to.

Each of the blockchains 210, 230, 240 may be associated with one or more transacting agents 214, 234, 254 that generate transactions in that particular blockchain. Thus, the node $TAG_1$ may generate a transaction representing production of a batch of particular produce. Additionally, each of the blockchains 210, 230, 250 may be associated with one or more mining agents 212, 232, 252 that validate transactions in that particular blockchain. Thus, for example, the nodes $MG_{1-N}$ may be miner nodes for the grower DL 210, nodes $MD_{1-N}$ may be miner nodes for the distributor DL 230, and nodes $MS_{1-N}$ may be miner nodes for the seller DL 250. In this case the nodes $MG_{1-N}$ 212 may collectively approve a transaction generated by a transaction node $TAG_i$ 214 by solving a proof of work problem.

Additionally, each of the blockchains in the BTFS 200 may be associated with various forwarding agents, the task of these forwarding agents being monitoring transactions on multiple blockchains base on a set of rules when a transaction in one blockchain needs to be forwarded to another blockchain. Thus, a node $FA_1$ 216 may monitor forwarding of a transaction from the grower DL 210 to the distributor DL 230, and vice versa. In one implementation, the node $FA_1$ 216 may use a whitelist information and or hop count associated with the transaction to determine the that particular transaction should be forwarded.

Additionally, each of the blockchains in the BTFS 200 may be associated with various validation agents, the task of these validation agents being independently verifying that the actions of the forwarding agents are valid. For example, a validating agent $VA_1$ 218 may monitor forwarding decisions made by the forwarding agent $FA_1$ 216. In one implementation, the mining agents 212, 232, etc., may also act as validating agents.

Figure 3:
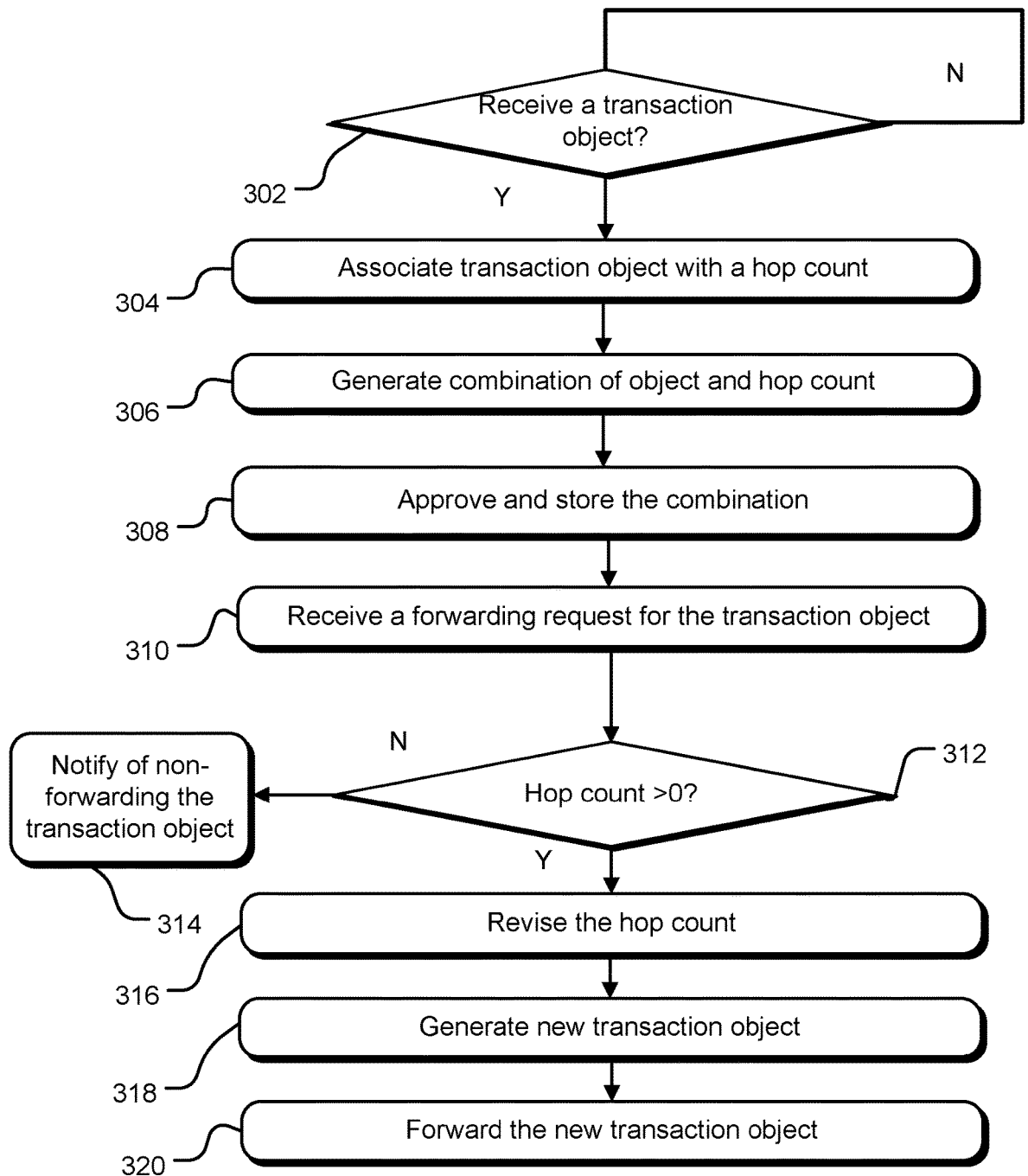
FIG. 3 illustrates example operations for forwarding transactions between a plurality of different blockchains.

FIG. 3 illustrates example operations 300 for forwarding transactions between a plurality of different blockchains. An operation 302 receives a transaction object that is generated in response to a transaction. For example, a transaction object may be generated when a grower of a produce generates a package for produce where the transaction object includes information identifying the grower, the location, the produce type, the produce quantity, the produce quality identifying characteristics, etc. In response to receiving the transaction, an operation 304 associates the transaction object with a hop count that specifies the number of blockchains to which a given transaction can be forwarded to.

An operation 306 generates a combination of the object and the hop count. Such combination may itself be a transaction that is encrypted to generate a hash. The combined transaction is approved by transacting agents and stored on various nodes of the blockchain at operation 308. For example, a number of mining nodes associated with that blockchain approve the combination of the transaction with the hop count.

An operation 310 receives a forwarding request for the transaction object. For example, such a forwarding request may be generated by a forwarding agent associated with the blockchain. In an example, implementation, a forwarding agent controlling forwarding of transactions between a grower DL and a distributor DL may generate such a request to the grower DL. A determining operation 312 evaluates the hop count associated with the transaction. Such evaluation operation 312 may involve decrypting the combination of hash and the hop count to parse out the hash count and comparing its value to zero. If the value is zero, an operation 314 notifies the requesting blockchain that the particular transaction is not available for forwarding.

On the other hand, if the hop count is greater than zero, an operation 316 revises the hop count by reducing the hop count by one (1). An operation 318 generates a new combined transaction object by combining the stripped original transaction object with the revised hop count and an operation 320 forwards the revised transaction object to the requesting blockchain.

Figure 4:
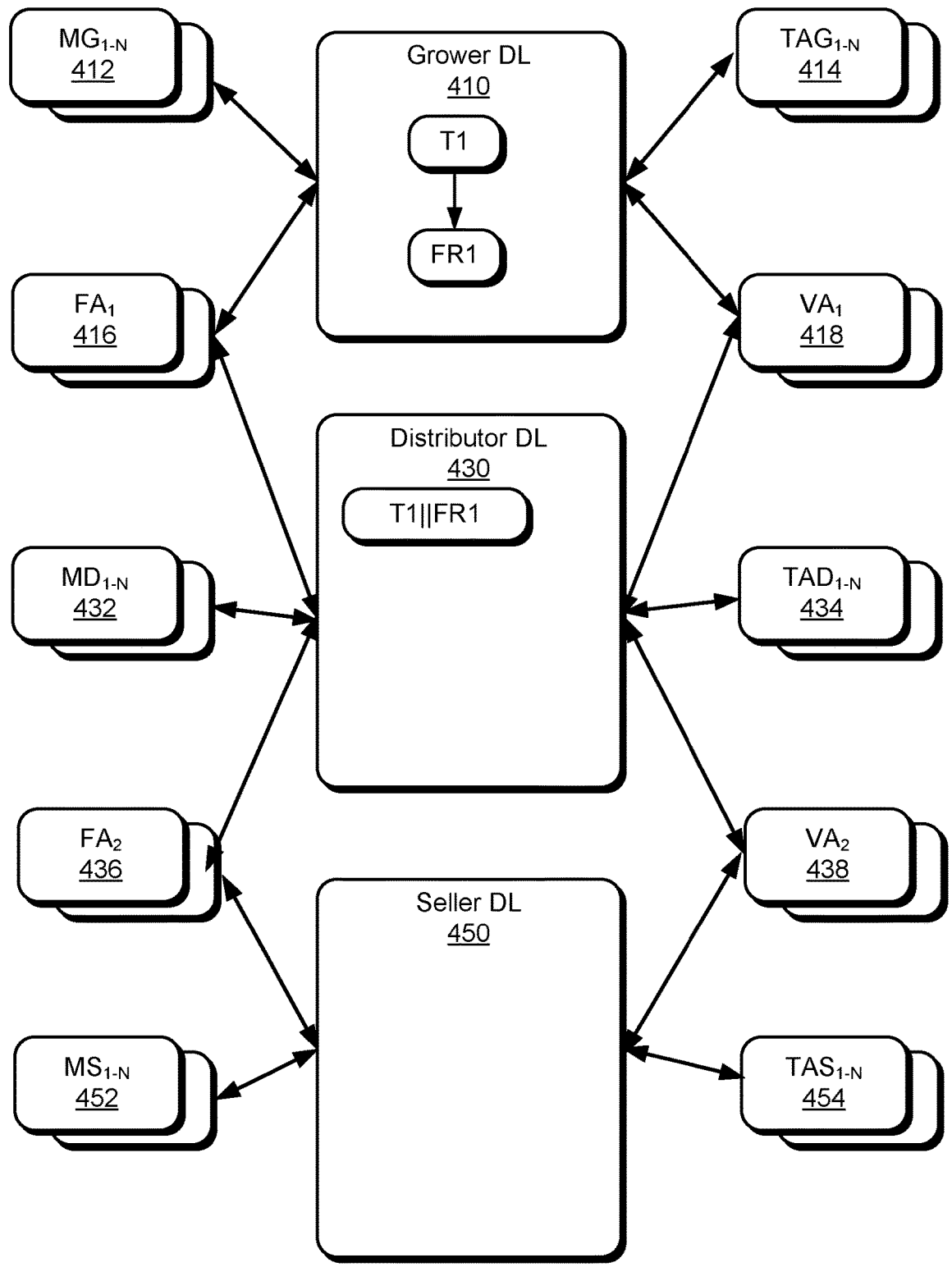
FIG. 4 illustrates an alternative block diagram of the blockchain transaction forwarding system disclosed herein.

FIG. 4 illustrates an alternative block diagram of the blockchain transaction forwarding system 400 disclosed herein. Specifically, the BTFS 400 illustrates generation of a transaction T1 in a grower blockchain 410 and resulting additional transactions. For example, T1 may be generated by a transacting agent $TAG_1$ 414 for production of, say 100 boxes of peaches. The miners MG 412 have to approve the transaction T1 before it is added to the grower blockchain 410. In one implementation, the transaction T1 may also specify the hop count for the transaction T1 as well as a whitelist for the transaction T1. Here, the hop count may specify the number of times the transaction T1 can be forwarded to other blockchains. The whitelist may specify the list of blockchain to which the transaction T1 may be forwarded.

Once the transaction T1 is added, a forwarding agent $FA_1$ 416 may detect that the 100 boxes of peaches that are represented by transaction T1 are being sent to a distributor B, where the distributor B is participant of the distributor blockchain 430. In one implementation, such detection may result from a request generated by the distributor B. Upon detection of the forwarding of the commodity, such as the peaches, the forwarding agent $FA_1$ 416 generates a forwarding approval request transaction FR1 on the grower blockchain 410. In one implementation, before generating the forwarding approval request transaction FR1, the forwarding agent analyzes the transaction T1 to determine the hop count and the whitelist related to transaction T1 to determine if the transaction T1 can be forwarded to the distributor blockchain 430.

The forwarding approval request transaction FR1 is added to the grower blockchain 410 once the miners MG 412 approve it. Once the forwarding approval request transaction FR1 is added to the grower blockchain, the forwarding agent $FA_1$ 416 may generate a new transaction T1||FR1 that represents the forwarding of the T1 transaction to the distributor blockchain 430. Furthermore, the forwarding agent $FA_1$ 416 may reduce the hop count associated with the new transaction T1||FR1, representing the reduced number of times that any transaction generated from T1 can be forwarded.

In one implementation, the miners MG 412 may require that a validating agent 418 approves the forwarding of the transaction T1 before they approve the forwarding approval request transaction FR1 and the additional transaction T1||FR1. Furthermore, the new transaction T1||FR1 is also added to the distributor blockchain 430 once the miners MD 432 approve this transaction. In one implementation, the miners MD 432 may also require validation from the validating agent 418 before approving the transaction T1||FR1.

Figure 5:
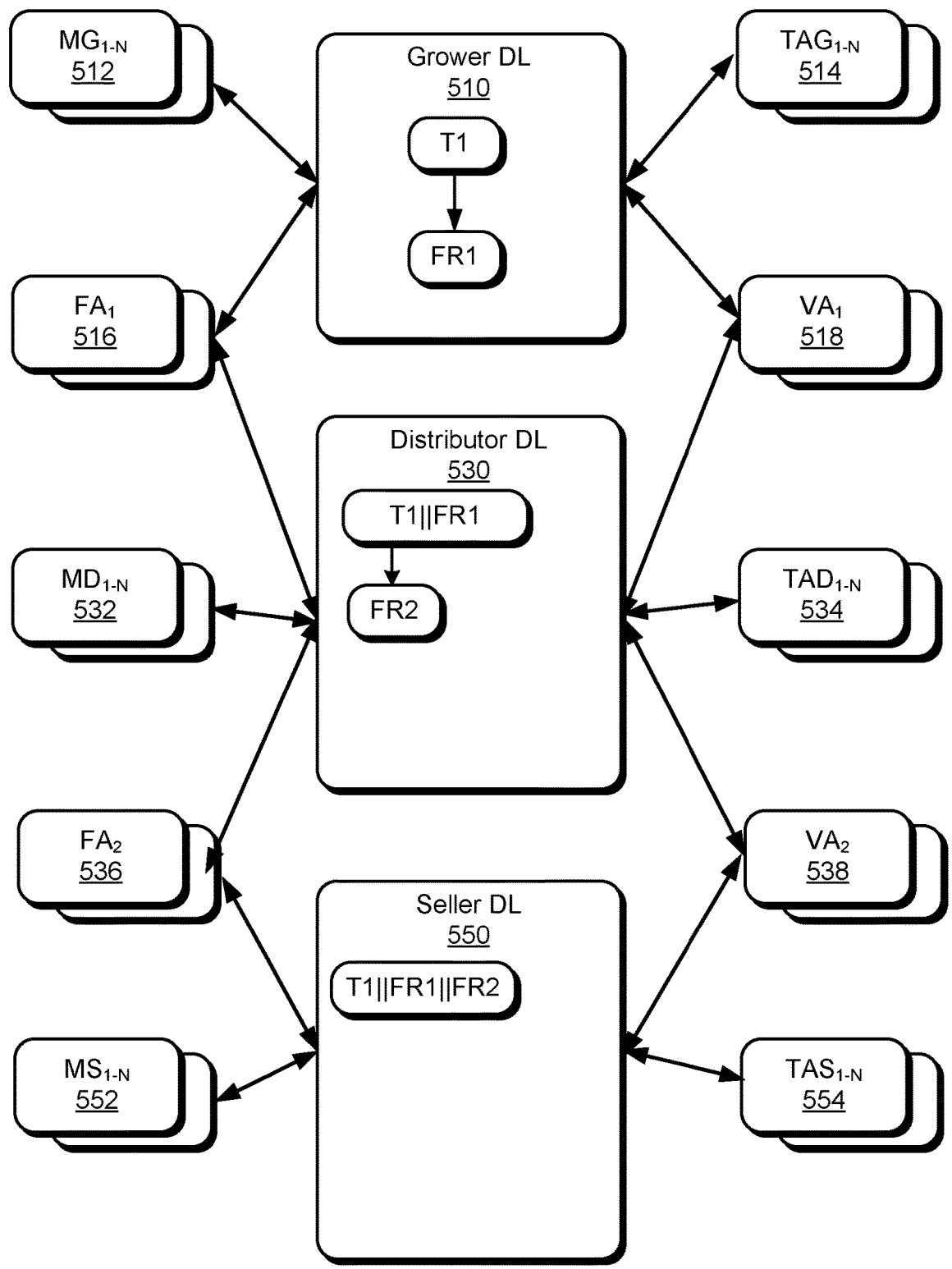
FIG. 5 illustrates another example block diagram of the blockchain transaction forwarding system at another intermediate stage.

FIG. 5 illustrates another example block diagram of the blockchain transaction forwarding system 500 at another intermediate stage. Specifically, at this stage, a forwarding agent $FA_2$ 536 may be notified that the produce represented by T1 and T1||FR1 is destined for a seller C in the seller blockchain 550. In response, the forwarding agent $FA_2$ 536 may generate a forwarding approval request transaction FR2 on the distributor blockchain 530 to forward the transaction T1||FR1 to the seller blockchain 550. The forwarding agent $FA_2$ 536 may review the hop count and the whitelist associated with the transaction T1||FR1 before it generates the forwarding approval request transaction FR2. Once the miners MD 532 approve the forwarding approval request transaction FR2, it is added to the distributor blockchain 530.

Furthermore, the forwarding agent $FA_2$ 536 also generates a new transaction T1||FR1||FR2 that represents the movement of the produce from a grower participant in the grower blockchain 510 to a seller participant in the seller blockchain 550. Before the transaction T1||FR1||FR2 is added to the seller blockchain 550, it has to be approved by the miners MS 552. In one implementation, the miners 552 may require approval from a validating agent $VA_2$ 536 before approving the transaction T1||FR1||FR2. Furthermore, the forwarding agent $FA_2$ 536 may also change the hop count associated with the newly created transaction T1||FR1||FR2.

Figure 6:
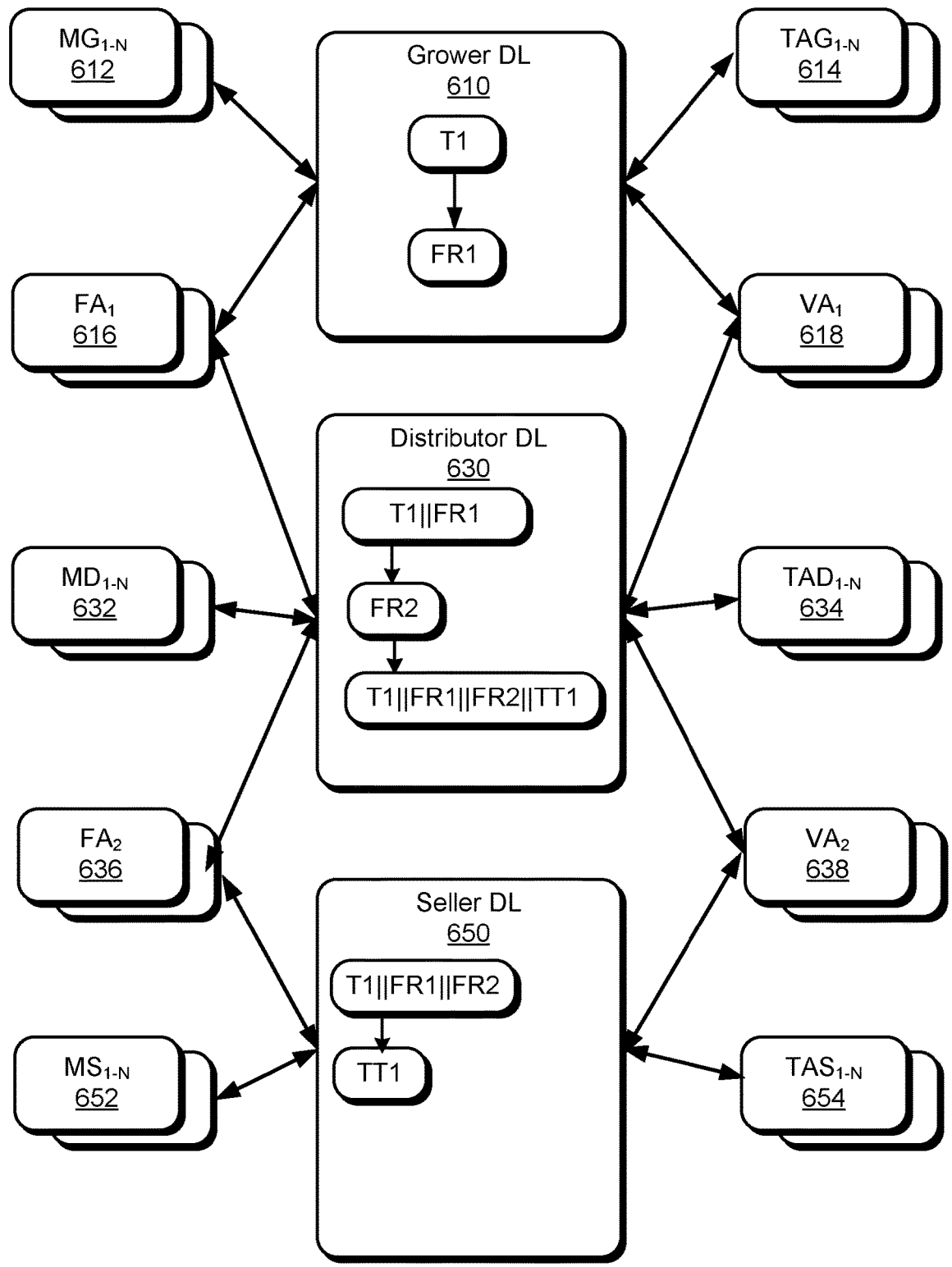
FIG. 6 illustrates yet another example block diagram of the blockchain transaction forwarding system at yet another intermediate stage.

FIG. 6 illustrates yet another example block diagram of the blockchain transaction forwarding system 600 at yet another intermediate stage. Specifically, the produce represented by the transaction T1 and related intermediate transactions may be sold and a transacting agent TAS 654 in the seller network may generate a transaction TT1 representing the sale or the termination of the life cycle of the produce. Once the transaction TT1 is approved by the miners MS 652, it is added to the seller blockchain 650. the forwarding agent $FA_2$ 636 may detect the creation of the transaction TT1 and in response may decide to generate transactions that reports the sale information back to the distributor blockchain 630 and to the grower blockchain 610.

In one implementation, the initial transaction T1 in the grower blockchain 610 may also specify a backward reporting requirement. For example, some participants in the grower blockchain 610 may specify that when the sale transaction TT1 is created it would like to be notified. The forwarding agent $FA_2$ 636 may detect such requirement and/or permission for back reporting from the transaction T1||FR1||FR2 and if appropriate, it creates a new transaction T1||FR1||FR2||TT1 and communicates it to the distributor blockchain 630. Once approved by the miners MD 632, the transaction T1||FR1||FR2||TT1 is added to the distributor blockchain 630.

Figure 7:
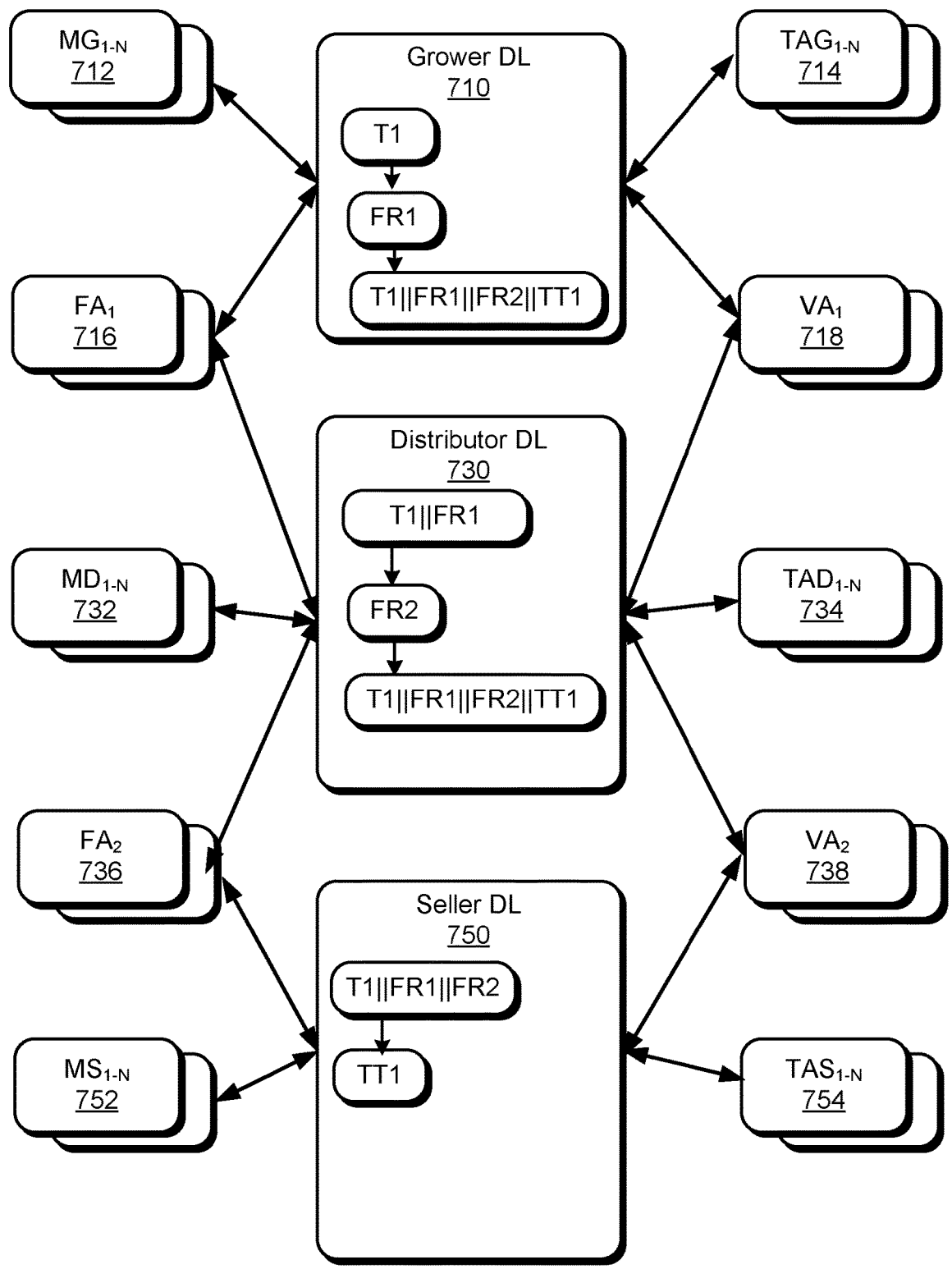
FIG. 7 illustrates yet another example block diagram of the blockchain transaction forwarding system at yet another intermediate stage.

FIG. 7 illustrates yet another example block diagram of the blockchain transaction forwarding system 700 at yet another intermediate stage. Specifically, a forwarding agent $FA_1$ 716 detects the generation of the transaction T1||FR1||FR2||TT1 in the distributor blockchain 730 and in response, it forwards the back reporting transaction T1||FR1||FR2||TT1 to the grower blockchain 710. Once the miners MG 712 approve it, the transaction T1||FR1||FR2||TT1 is added to the grower blockchain 710. In one implementation, the miners MG 712 may require validation from a validating agent 718 before they approve the transaction T1||FR1||FR2||TT1 to be added to the grower blockchain 710.

Figure 8:
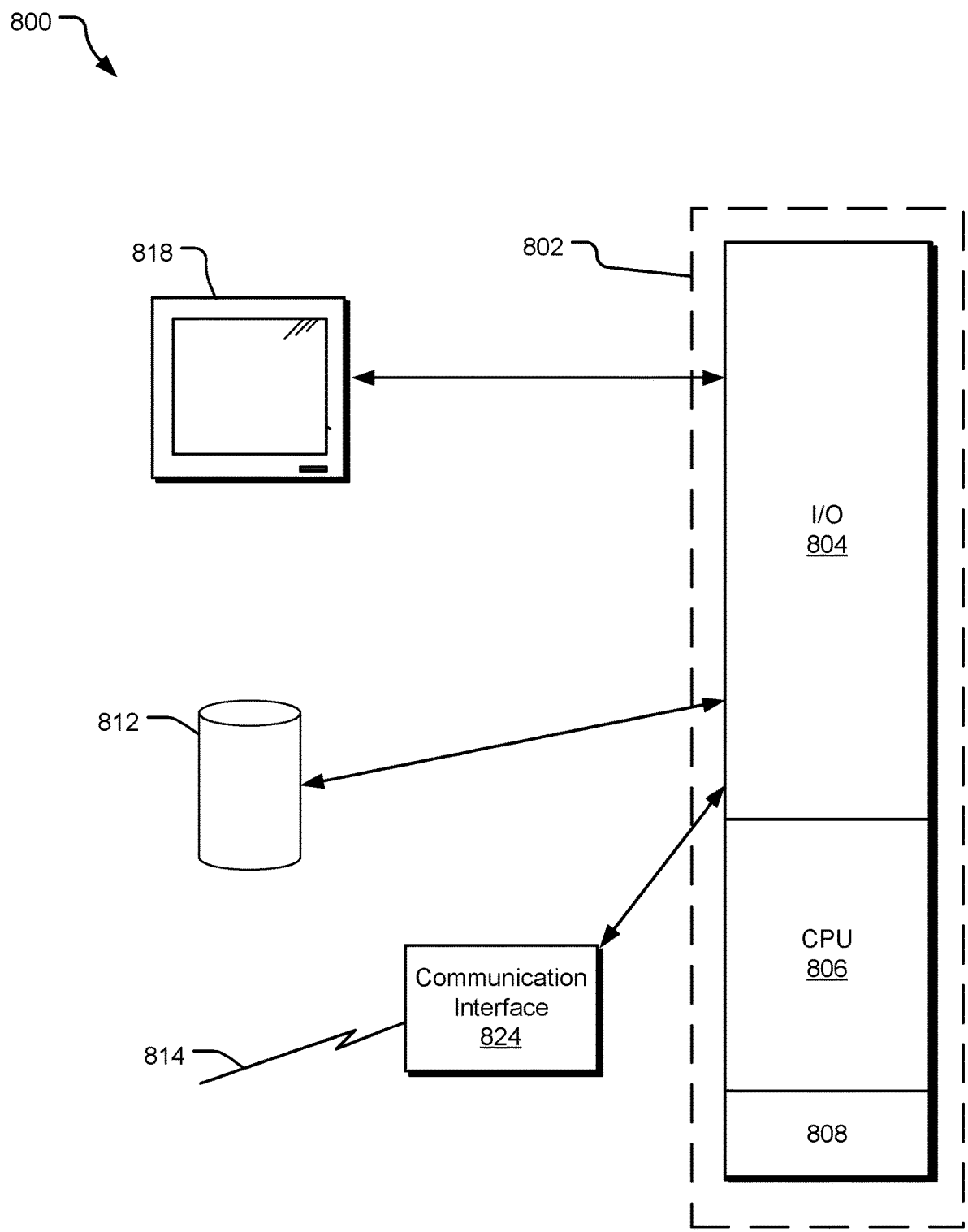
FIG. 8 illustrates an example processing system that may be useful in implementing the described technology.

FIG. 8 illustrates an example processing system 800 that may be useful in implementing the described technology. The processing system 800 is capable of executing a computer program product embodied in a tangible computer-readable storage medium to execute a computer process. Data and program files may be input to the processing system 800, which reads the files and executes the programs therein using one or more processors (CPUs or GPUs). Some of the elements of a processing system 800 are shown in FIG. 8 wherein a processor 802 is shown having an input/output (I/O) section 804, a Central Processing Unit (CPU) 806, and a memory section 808. There may be one or more processors 802, such that the processor 802 of the processing system 800 comprises a single central-processing unit 806, or a plurality of processing units. The processors may be single core or multi-core processors. The processing system 800 may be a conventional computer, a distributed computer, or any other type of computer. The described technology is optionally implemented in software loaded in memory 808, a storage unit 812, and/or communicated via a wired or wireless network link 814 on a carrier signal (e.g., Ethernet, 3G wireless, 8G wireless, LTE (Long Term Evolution)) thereby transforming the processing system 800 in FIG. 8 to a special purpose machine for implementing the described operations. The processing system 800 may be an application specific processing system configured for supporting a distributed ledger. In other words, the processing system 800 may be a ledger node.

The I/O section 804 may be connected to one or more user-interface devices (e.g., a keyboard, a touch-screen display unit 818, etc.) or a storage unit 812. Computer program products containing mechanisms to effectuate the systems and methods in accordance with the described technology may reside in the memory section 808 or on the storage unit 812 of such a system 800.

A communication interface 824 is capable of connecting the processing system 800 to an enterprise network via the network link 814, through which the computer system can receive instructions and data embodied in a carrier wave. When used in a local area networking (LAN) environment, the processing system 800 is connected (by wired connection or wirelessly) to a local network through the communication interface 824, which is one type of communications device. When used in a wide-area-networking (WAN) environment, the processing system 800 typically includes a modem, a network adapter, or any other type of communications device for establishing communications over the wide area network. In a networked environment, program modules depicted relative to the processing system 800 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 808 and/or the storage unit 812 and executed by the processor 802. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 808 and/or the storage unit 812 and executed by the processor 802.

The processing system 800 may be implemented in a device, such as a user device, storage device, IoT device, a desktop, laptop, computing device. The processing system 800 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of providing a mechanism for forwarding transaction between a plurality of blockchains, the method comprising:

receiving a transaction object at a storage device, the storage device storing one or more blockchain data structures generated and managed by the storage device for a first blockchain;

associating the transaction object with a hop count specifying the number of blockchains to which the transaction object can be forwarded;

cryptographically signing a combination of the transaction object and the hop count using a cryptographic key associated with the storage device and storing the signed combination in the one or more blockchain data structures;

receiving a forwarding request from a forwarding agent node to forward the transaction object to a second blockchain; and in response to determining that the hop count is greater than zero, revising the hop count associated with the transaction object in the first blockchain and generating a new transaction object using the transaction object, the forwarding request, and the revised hop count.

2. The method of claim 1, further comprising forwarding the new transaction object to the second blockchain.

3. The method of claim 1, wherein the hop count further specifying the total number of additional disparate blockchains to which the transaction object can be forwarded.

4. The method of claim 1, further comprising validating the forwarding request and the forwarding of the new transaction object to the second blockchain.

5. The method of claim 4, further comprising associating the transaction object with a list of approved blockchains to which the transaction object can be forwarded.

6. The method of claim 5, further comprising validating the forwarding request based on the list of approved blockchains to which the transaction object can be forwarded.

7. The method of claim 1, wherein receiving a forwarding request from a forwarding agent node to forward the transaction object to a second blockchain further comprising receiving a forwarding request to forward a termination transaction and generating a termination transaction object using the termination transaction.

8. The method of claim 7, further comprising communicating the termination transaction object to the first blockchain.

9. The method of claim 8, further comprising:
in response to receiving the termination object, removing the signed combination from the one or more blockchain data structures of the first blockchain.

10. The method of claim 1, further comprising associating a back-reporting specification with the transaction object, the back-reporting specification specifying permissions for back-reporting a chain of transactions from other blockchains to the first blockchain.

11. One or non-transitory more processor-readable storage media encoding processor-executable instructions for executing on a computer system a computer process, the computer process comprising:
receiving a transaction object at a storage device, the storage device storing one or more blockchain data structures generated and managed by the storage device for a first blockchain;

associating the transaction object with a hop count specifying the number of blockchains to which the transaction object can be forwarded;

cryptographically signing a combination of the transaction object and the hop count using a cryptographic key associated with the storage device and storing the signed combination in the one or more blockchain data structures;

receiving a forwarding request from a forwarding agent node to forward the transaction object to a second blockchain; and in response to determining that the hop count is greater than zero, revising the hop count associated with the transaction object in the first blockchain and generating a new transaction object using the transaction object, the forwarding request, and the revised hop count.

12. The one or non-transitory more processor-readable storage media of claim 11, wherein the computer process further comprising forwarding the new transaction object to the second blockchain.

13. The one or non-transitory more processor-readable storage media of claim 11, wherein the hop count further specifying the total number of additional disparate blockchains to which the transaction object can be forwarded.

14. The one or non-transitory more processor-readable storage media of claim 11, wherein the computer process further comprising validating the forwarding request and the forwarding of the new transaction object to the second blockchain.

15. The one or non-transitory more processor-readable storage media of claim 14, wherein the computer process further comprising associating the transaction object with a list of approved blockchains to which the transaction object can be forwarded.

16. The one or non-transitory more processor-readable storage media of claim 15, wherein the computer process further comprising validating the forwarding request based on the list of approved blockchains to which the transaction object can be forwarded.

17. The one or non-transitory more processor-readable storage media of claim 15, wherein the computer process further comprising associating a back-reporting specification with the transaction object, the back-reporting specification specifying permissions for back-reporting a chain of transactions from other blockchains to the first blockchain.

18. A system comprising:
one or more processors;
a memory;
a transacting node configured to:
receiving a transaction object at a storage device, the storage device storing one or more blockchain data structures generated and managed by the storage device for a first blockchain,
associating the transaction object with a hop count specifying the number of blockchains to which the transaction object can be forwarded,
cryptographically signing a combination of the transaction object and the hop count using a cryptographic key associated with the storage device and storing the signed combination in the one or more blockchain data structures; and
a forwarding node configured to:
detect the generation of the transaction object in the first blockchain, and
in response to the detection of the generation of the transaction object in the first blockchain determine that the hop count is greater than zero, revise the hop count associated with the transaction object in the first blockchain and generate a new transaction object using the transaction object, the forwarding request, and the revised hop count.

19. The system of claim 18, wherein the transacting node is further configured to associate the transaction object with a list of approved blockchains to which the transaction object can be forwarded.

20. The system of claim 18, wherein the transacting node is further configured to associate a back-reporting specification with the transaction object, the back-reporting specification specifying permissions for back-reporting a chain of transactions from other blockchains to the first blockchain.

* * * * *